(12) United States Patent
Wu et al.

(10) Patent No.: US 6,496,481 B1
(45) Date of Patent: Dec. 17, 2002

(54) DATA TRANSFER METHOD FOR WIRE REAL-TIME COMMUNICATIONS

(75) Inventors: Chiung-Shien Wu, Taipei (TW); Gin-Kou Ma, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 09/116,681

(22) Filed: Jul. 16, 1998

(51) Int. Cl.$^7$ .............................. H04J 1/16; H04J 3/14
(52) U.S. Cl. ...................................... 370/242; 370/310
(58) Field of Search ............................... 370/242, 310, 370/473; 714/748, 738, 749

(56) References Cited

U.S. PATENT DOCUMENTS

| | | | | |
|---|---|---|---|---|
| 4,377,862 A | * | 3/1983 | Koford et al. | 714/748 |
| 4,975,952 A | * | 12/1990 | Mabey et al. | 380/49 |
| 5,084,877 A | * | 1/1992 | Netravali et al. | 714/748 |
| 5,130,986 A | * | 7/1992 | Doshi et al. | 370/231 |
| 5,856,975 A | * | 1/1999 | Rostoker et al. | 370/395 |
| 5,896,394 A | * | 4/1999 | Fukuda | 714/748 |
| 6,016,567 A | * | 1/2000 | Fujiwara | 714/748 |
| 6,134,693 A | * | 10/2000 | Fukuda | 714/749 |
| 6,161,207 A | * | 12/2000 | Lockhart et al. | 370/473 |
| 6,249,894 B1 | * | 6/2001 | Lin et al. | 714/748 |
| 6,275,471 B1 | * | 8/2001 | Bushmitch et al. | 714/748 |

* cited by examiner

Primary Examiner—Salvatore Cangialosi
(74) Attorney, Agent, or Firm—Birch, Stewart, Kolasch & Birch, LLP

(57) ABSTRACT

A transport protocol that meets the requirements and performance for multimedia data transfer in a wireless link includes a transmitting/sending station and a receiving station. The inventive protocol is referred to as the Burst-oriented Transport with Time-bounded Retransmission (BTTR). This scheme uses a large transmission window for sending/receiving a burst of time-sensitive data and, within this window, several smaller observation windows are used for dynamic error retransmission. There is a time limitation on each retransmission such that the burst of data can be received in a timely manner, and thus trading some packet losses (still in an acceptable range) for delay and throughput performance. Specifically, the wireless network includes a wireless station for transmitting data over a wireless link. The sending station transmits a plurality of sequential data packets to the receiving station, wherein each plurality of sequential data packets form a respective Group-of-Packet (GOP). The receiving station detects whether any of the received data packets in each current GOP are corrupted before receipt of all data packets in the current GOP. The receiving station then transmits a negative acknowledgement (ACK) packet to the sending station before the receipt of all data packets in the current GOP, if at least one data packet in the current GOP is corrupted. Note that the ACK packet indicates which data packets are corrupted. In addition, the sending station selectively retransmits the data packets based on the indication of the received ACK packet before transmitting the next GOP to the receiving station.

16 Claims, 12 Drawing Sheets

$t_p$: signal propagation delay
 $u$: the time of sending an ACK
 $n$: packet group size ($W_0$)

SID: Starting packet ID     EID: Ending packet ID

NOB: number of outstanding blocks

DATA TRANSFER METHOD FOR WIRE REAL-TIME COMMUNICATIONS

FIELD OF THE INVENTION

The present invention relates to a network and method of transmitting data packets, and, more particularly, relates to a network and transport protocol method of transmitting data packets over a wireless link for use in real-time multimedia applications.

BACKGROUND OF THE INVENTION

Wireless communication systems are now looking towards broadband solutions for future multimedia transmission. Wireless extension of broadband communications provides a radio access for the customers to enjoy integrated multimedia services. Technologies supporting such services include local area networks (LANs), wide area networks (WANs), wireless ATM, LMDS (Local Multipoint Distribution Service), MMDS (Multipoint Multichannel Distribution Service, or wireless cable), and broadband satellite communications. All of these systems are aimed to transmit data at a transmission speed from several Mega to several hundreds of Mega bits per seconds.

As compared with wired broadband systems, there are additional factors that make the design of the wireless broadband system more difficult. For example, wireless communication systems are less reliable then wired systems due to a higher bit error rate, a comparatively longer propagation delay (especially as the transmission speed getting higher), and a higher packet error rate caused by less reliable links and movement of the mobile stations. It has been shown that the cell loss rate in a wireless ATM system is around $10^{-3}$ to $10^{-5}$ with a bit error rate range $10^{-4}$ to $10^{-6}$. Further, in a wireless ATM system having a transmission speed of 25 Mbps, it takes about 20 $\mu$sec to transmit a cell. This implies that the propagation delay may equal the time it takes to of transmit several cells in a wireless LAN or the time it takes to transmit several tens of cells in a wireless WAN. These factors will affect the throughput of a flow-controlled transport protocol.

Another issue is the asymmetry in wireless communication systems. Many studies have shown that the communication protocol between a wireless station and its wired access point should be asymmetric because of the limited resources on a wireless station (e.g., a lightweight handheld device). They suggest that the complicated part of a transport protocol should be put on the wired access point which may have more power to handle the tasks. However, performance tends to decrease as complicated tasks are removed from the wireless station. Accordingly, it has been recently recommended that the end-to-end transport protocol over wireless access network be divided into two parts in order to have a better performance, i.e., Indirect-TCP, and Mobile-TCP. This approach uses traditional transport protocols such as TCP on the wired part and requires a new design on transport and data link protocol for the wireless part. At the wireless access point (or base station), some protocol will also be necessary.

A further issue regarding the data transfer between two entities over a communication network requires careful flow controls on both sides to prevent the loss of packets due to, e.g., a shortage of buffers, a mismatch of processing rate, etc. Typical schemes can be classified into rate-based and quantum-based approaches. In the rate-based approach, the speed of sending packets is determined by its rate, i.e., by controlling the delay time gap between the sending of two consecutive packets. In the quantum-based scheme, the speed of sending packets is based on the receiver's available resources, such as buffers. As shown in FIG. 17, the receiver grants a window (W packets) for the transmitter via a control packet. Typically, this control packet is called an ACK packet (acknowledgment packet). However, the performance of this scheme is poor when the network link can process a large number of packets. In this case the network will have to wait for each packet to enter the receiving buffer. Further, control packets will also take a lot of time to arrive at the transmitter. In addition, during the sending of the control packet, other packets are not permitted to be sent. The well-known Internet protocol TCP/IP is currently using this method.

In U.S. Pat. No. 5,084,877 and in the I.E.E.E. article entitled, "Design and Implementation of a High Speed Transport Protocol", I.E.E.E. Transactions on Communications, Vol. 38, No. 11, November 1990, pp.2010–2023 by A. N. Netravali, et al. a more aggressive approach has been proposed. In this method, the maximum possible number of outstanding packets is estimated, such that the packets may be sent earlier with a hope that the receiver will release new resources as the packets are received. With reference to FIG. 18, the control packet will carry available buffer information and maximum packet sequence number received information, W and $LW_r$, respectively, to the sending site. Let $UW_t$ be the packet sequence number which is about to be sent. Then NOB can be estimated by $$UW_t - LW_r$$

At the transmitter, the rules for permitting the transmission of a packet would be based on a control window L. When NOB<L and W-NOB>O, then a new packet can be sent. This scheme can improve the throughput of sending large continuous and burst data. However, when the network link, e.g., a wireless link, has a high packet error rate, then it is likely that packets will be dropped. If a packet is dropped, then it needs to be retransmitted. The traffic load brought by retransmission may lower the throughput of sending normal packets. Since the network capacity is large (which exhibits a long propagation delay), the receiver state cannot quickly feed back to the transmitter due to the delay of control packets. Further, the NOB may be overestimated and pause the transmission. Thus, the system will be forced to idle before new control packet arrive. In this case, using a large control window L value and a large receiver buffer may relieve the problems but requires more space and expense.

In U.S. Pat. No. 5,130,986, a two-window scheme was proposed to improve the above drawbacks. In this scheme, illustrated in FIG. 19, a receiver status map (RSM) is utilized having L bits, where each bit denotes the receiving status of the recently or soon to be received L packets. A bit 1 (0) represents that the packet is correctly (incorrectly) received and has been (not yet) stored in one of the L packet buffer spaces. Let N (RSM) denote the sum of all 1 bits in RSM. Thus, N (RSM) represents the current uncorrupted packets received but having not been acknowledged yet. Note, only when all packets are reassembled in sequence, can they be put on upper application processes. If there are still some sequence numbers missing, then the packets they should remain in the buffer.

In this scheme, a better estimation of NOB is:

$$NOB - N\ (RSM)$$

By using two windows L1, and L2, and letting L2 be very large and L1 be approximately the network capacity, the performance can be improved.

With respect to the transport protocol, two control windows are used for controlling the volume of transmitted information, e.g., the number of packets. The first window, called the network window, is used to limit the data in the network so that network buffer resources can be sized economically and to prevent excessive packet loss. The second window, called the receiver flow control window, is used to assure that packets are not dropped. However, this only inhibits packet loss due to the shortage of buffers. When the network itself is lossy, the retransmission traffic will become heavy. This is especially true when the network capacity is large. In such a case, the effect will make the throughput worse since the exchange of control packets will take more time. In a more serious case, when the control packet is lost, the system will be forced to idle and can only be resumed by a timer.

U.S. Pat. Nos. 5,222,061 and 4,439,859 are related to the retransmission protocols where a major concern is the packet receiving sequence. U.S. Pat. Nos. 4,712,214, 4,928,096 and 4,975,952 are also related to retransmission protocols but use a different approach. This scheme uses a special data arrangement on the transmission of packets. For example, error correction codes and/or interleaving techniques are used to reduced the overhead of retransmission.

In U.S. Pat. No. 5,084,877, packet retransmission is reduced by frequent and periodic exchanges of absolute state information, in lieu of incremental information. That is, only the error packet will be retransmitted.

In I.E.E.E. article entitled, "A Retransmission Scheme for Circuit-Mode Data on Wireless Links", I.E.E.E. Journal on Selected Area in Communications, Vol. 12, No.8, October 1994, pp. 1338–1352 by S. Nanda, et al., a scheme called RLP (radio link protocol) is disclosed that prevents the idle period during the loss of the control packets or during loss of the retransmitted packets. The scheme allows the sender to retransmit the unacknowledged packets preemptively when the system is in an idle state. Thus, there are possibly multiple copies of a unique packet that are outstanding in the networks. In a low-speed system with low network capacity, this scheme can efficiently improve the performance since the idle time has been removed and multiple copies of the packets may help the recovery of erroneous or lost packets.

However, in a high speed system with high network capacity, the advantages of this approach will not be significant. In this case, the exchange of control packets is slower and some idle time occurs if small receiving/transmitting buffers are used. This is true since the number of allowable outstanding packets may be large and thus a big number of multiple packet copies will be sent and congest the network.

It is therefore an object of the present invention to overcome the disadvantages of the prior art.

SUMMARY OF THE INVENTION

Based on the above prior art concerns, a transport protocol that meets the requirements and performance for multimedia data transfer in a wireless link is provided. Such a network configuration would require only small buffers on the both transmitting and receiving sides but permit a large number of outstanding packets unconditionally and independently to transmit to respective buffers. Further, there will not be any significant idle time during the transmission of a pre-granted burst of packets.

The inventive protocol is referred to as the Burst-oriented Transport with Time-bounded Retransmission (BTTR). This scheme uses a large transmission window for sending/receiving a burst of time-sensitive data and, within this window, several smaller observation windows are used for dynamic error retransmission. There is a time limitation on each retransmission such that the burst of data can be received in a timely manner, and thus trading some packet losses (still in an acceptable range) for delay and throughput performance.

Specifically, the wireless network includes a wireless station for transmitting data over a wireless link. The network, and in particular the wireless station includes a sending station and a receiving station. The sending station transmits a plurality of sequential data packets to the receiving station, wherein each plurality of sequential data packets form a respective Group-of-Packet (GOP). The receiving station detects whether any of the received data packets in each current GOP are corrupted before receipt of all data packets in the current GOP. The receiving station then transmits a negative acknowledgement (ACK) packet to the sending station before the receipt of all data packets in the current GOP, if at least one data packet in the current GOP is corrupted. Note that the ACK packet indicates which data packets are corrupted. In addition, the sending station selectively retransmits the data packets based on the indication of the received ACK packet before transmitting the next GOP to the receiving station.

BRIEF DESCRIPTION OF THE DRAWINGS

The following detailed description, given by way of example and not intended to limit the present invention solely thereto, will best be understood in conjunction with the accompanying drawings, in which.

DETAILED DESCRIPTION OF THE PRESENT INVENTION

Introduction

Generally, a wireless link is susceptible to higher packet error rate than a wired link. In addition, the ratio between the propagation delay and the packet transmission in a wireless link is not negligible. Typically, each wireless station comprises a transmitter and receiver pair where the transmitter and the receiver each have a small data buffer. Further, the wireless link typically has limited data processing capabilities.

Figure 16:
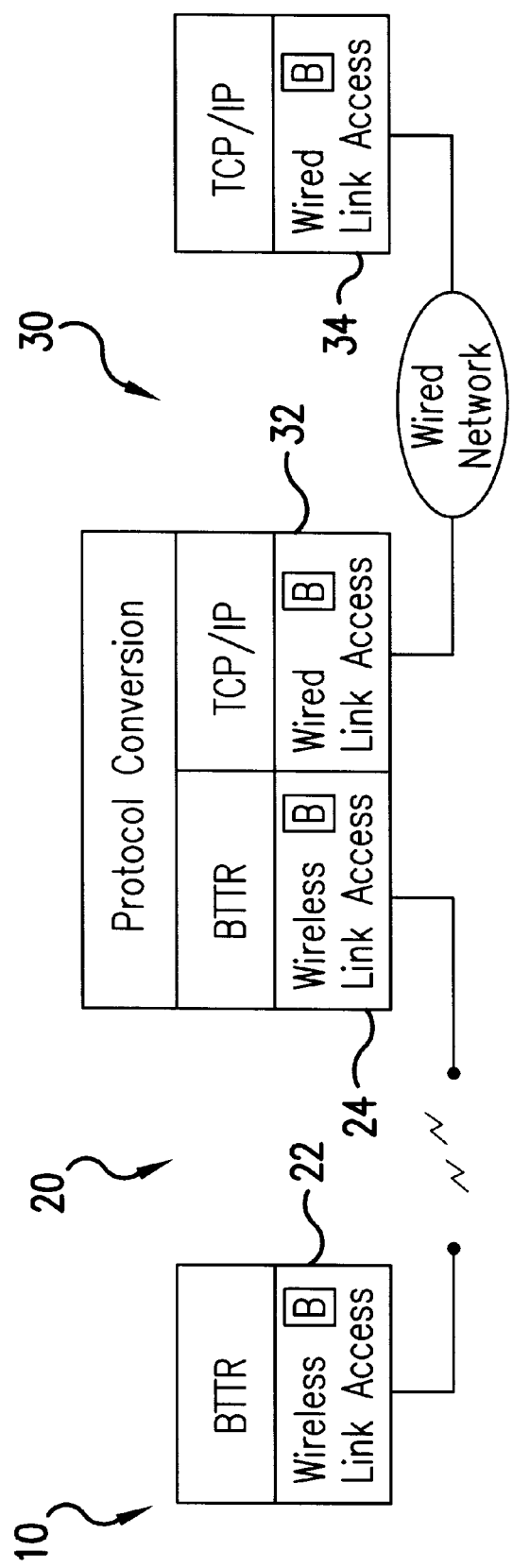
FIG. 16 schematically illustrates the network using the BTTR protocol in accordance with the present invention.
Figure 17:
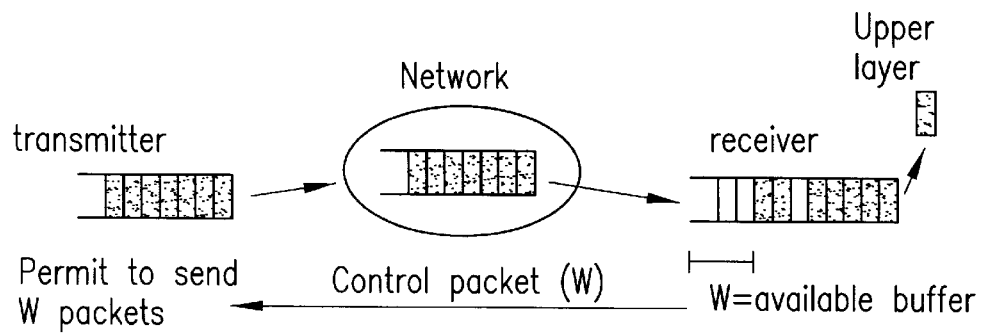
FIG. 17 illustrates the paradigm of a quantum based data flow control protocol.
Figure 18:
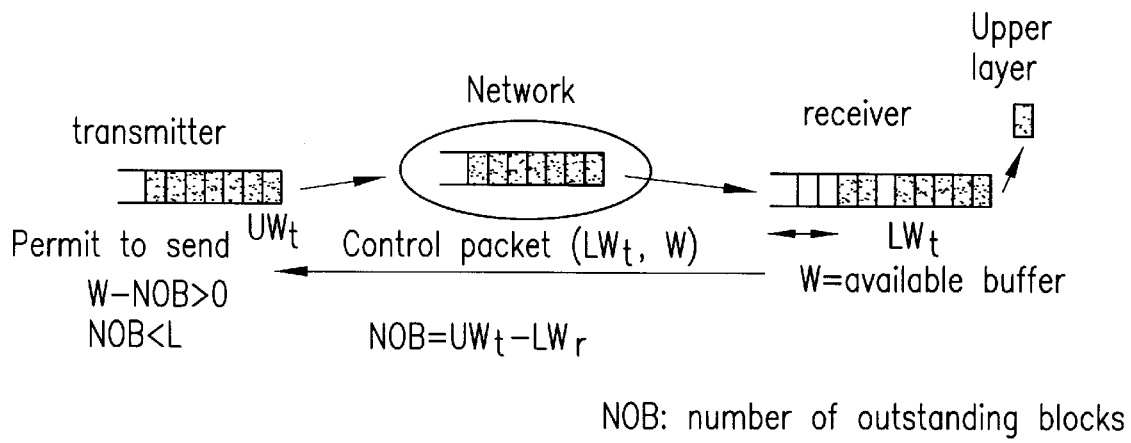
FIG. 18 illustrates the paradigm of an agressive quantum based data flow protocol.
Figure 19:
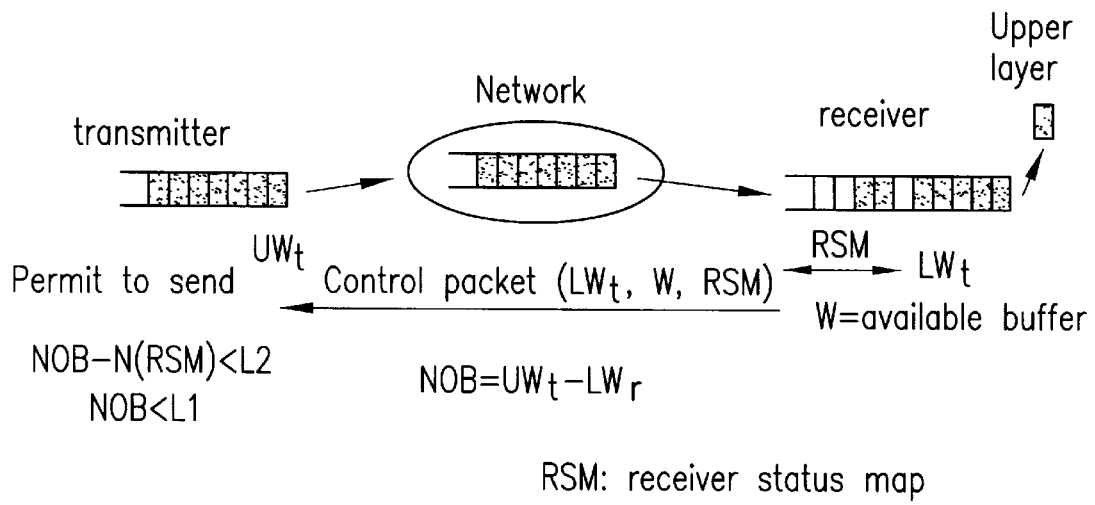
FIG. 19 illustrates the paradigm of a two window protocol.

The inventive protocol may be used on a network, as illustrated in FIG. 16. Network 10 includes a wireless station 20 having a transmitter/sender 22 and a receiver 24, which are the focus of the present invention. In addition, network 10 includes a wired station 30 also having a transmitter/sender 32 and a receiver 34. Each sender and receiver includes a buffer, B, to store data and information packets. As shown, the wireless station uses the inventive Burst-oriented Transport with Time-bound Retransmission (BTTR) protocol, while the wired station is illustrated having the ubiquitous TCP/IP protocol.

To provide for error control, Selective Repeat Automatic Repeat-Request ARQ (SR-ARQ) is conventionally used for retransmission of packets that are found to have errors. However, the semantics of error retransmission in the inventive BTTR protocol differs from the ordinary SR-ARQ method. Traditionally, a transmitter confirms that it has successfully transmitted a data packet to a receiver when a positive acknowledgment packet for the sent data packet is received. In some implementations, timers are often used at the transmitter. When a packet is sent, a corresponding timer will be set to a given period. It will be retransmitted when its timer is expired or a corresponding negative acknowledgement is received. This is known as the Positive ACK method. An immediate disadvantage to the Positive ACK is the large transfer latency when bit error rate on the link is very high. Thus, Positive ACK is not practical for real-time communication in a noisy environment.

In the BTTR protocol, a different error control semantic is used, called Negative ACK. In this scheme, a transmitter is identified to have successfully sent a data packet to the receiver if a negative acknowledgement (a negative ACK packet) is not received within a pre-defined period. Although an immediate disadvantage of using Negative ACK is that a high error rate can produce a proportionally high amount of ACK packets (thus increasing data transfer latency), real-time communication can be realistically achieved by limiting the number of negative ACK packets sent in the pre-defined time period. Thus, once this criteria is achieved, the inventive BTTR can be identified as a real-time robust link protocol.

The BTTR Protocol

The inventive BTTR protocol works on a burst-by-burst basis. A transmitting or sender station can send a burst of packets continuously without delay since the system need not wait for positive ACK packets, as is conventional. The burst length, denoted by $W_b$, is given in terms of the number of packets. Before sending a burst, the station should send a Burst_Request packet to the targeting receiver. Then, the receiver will issue a Burst_Confirmed packet to the transmitting station and grants it a burst window size $W_b$ (corresponding to the burst length). The process will then be followed by transferring the burst of packets between the sending station and the receiving station. Finally, the sending station will issue an End_of_Burst packet to the receiver.

During the burst transfer process, packets are partitioned into sub-groups, each referred to as a GOP (Group of Packet). Each burst may contain many GOPs, where each GOP consists of $W_o$ packets. Thus we have $$W_b = \alpha W_o, \; \alpha > 1$$

At the receiving station, the status of the receiving buffer will be examined and the ACK packet will be issued such that one ACK packet will arrive at the transmitter right before the next GOP is transmitted. The ACK packet uses the basic SR-ARQ method (albeit without positive ACK) for indicating the packet error status which is observed within the $W_o$ packets' transmission time (one GOP time). If there are any error packets, the sender will attempt to retransmit such error packet(s) before sending the next GOP.

The control information $W_b$ and $W_o$, briefly described above, will now be further explained. It is very common that the control information of a protocol is exchanged through packet header, e.g., by letting the information be carried in the header of the ACK packet which is sent from the receiver back to the transmitter. An example of exchanging $W_b$ and $W_o$ using packet header is now described as follows.

$W_b$ is for controlling the maximum number of outstanding packets, referred to as a transmission burst, that a transmitter may send without waiting any ACK packet. $W_o$ is a smaller control window that is used for limiting the size of a GOP. A GOP that is controlled by $W_o$ means that the receiving status of this group will be acknowledged by an ACK packet after counting $W_o$ packet transmission time (PTT). The content of $W_o$ will be extended dynamically by the receiver depending upon whether or not there are error packets. For synchronization purposes, $W_o$ is sent back to the transmitter for each GOP. Thus, two extra fields in the packet header is required.

Figure 20:
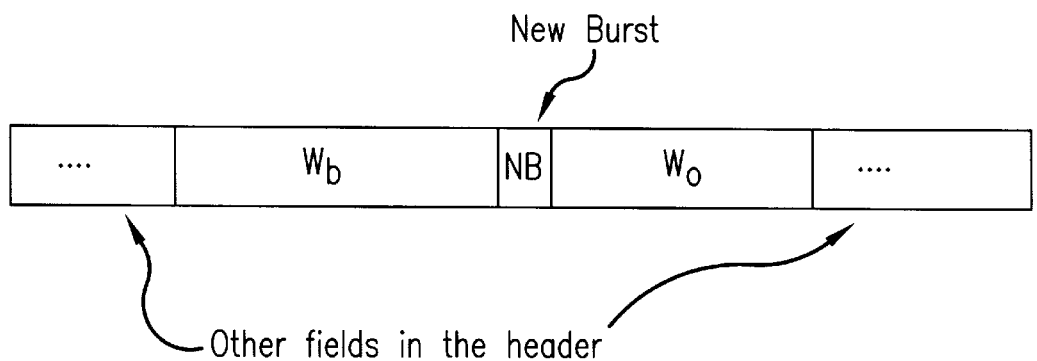
FIG. 20 illustrates the arrangement of the control windows in the packet header in accordance with the present invention.

FIG. 20 shows an example of arranging the control windows in the packet header. Illustratively, a flag NB (new burst) indicates that the content in the field $W_b$ is valid and is granting a new burst of transmission to the transmitter. In a protocol with fixed-length packets, the unit of these two fields can be in terms of packets to save the header space.

For simplicity, we use a single packet transmission time (PTT) as the unit time, discussed herein. Note that we have assumed a noisy wireless environment and a non-negligible link propagation delay. In order to achieve real-time communication and a continuous burst transfer, some principles should be followed, as described below.

1. In order to have one ACK packet arriving at the transmitter right before the next GOP is transmitted (to maintain continuous data transfer), the receiver should issue the ACK packet before receiving the complete GOP.
2. The receiving buffer status should be checked at every $W_o$ period. Each ACK packet will indicate the error status reflecting the new packets received within the current $W_o$ period.
3. The transmitter, upon receiving the ACK packet, will retransmit the corrupted data error packet(s) before sending the next GOP.
4. The ACK packet will be sent only once in every control window $W_o$.

Any corrupt data packet in the receiving buffer will cause an out-of-sequence packet stream, i.e., create a hole in the receiving buffer. Too many holes will exhibit visual flutter caused by an unacceptably high packet drop rate. Note that since there is only one chance for packet retransmission in every GOP, the error packet(s) can be recovered within a time-bounded delay, while maintaining an acceptable packet drop rate.

Figure 1:
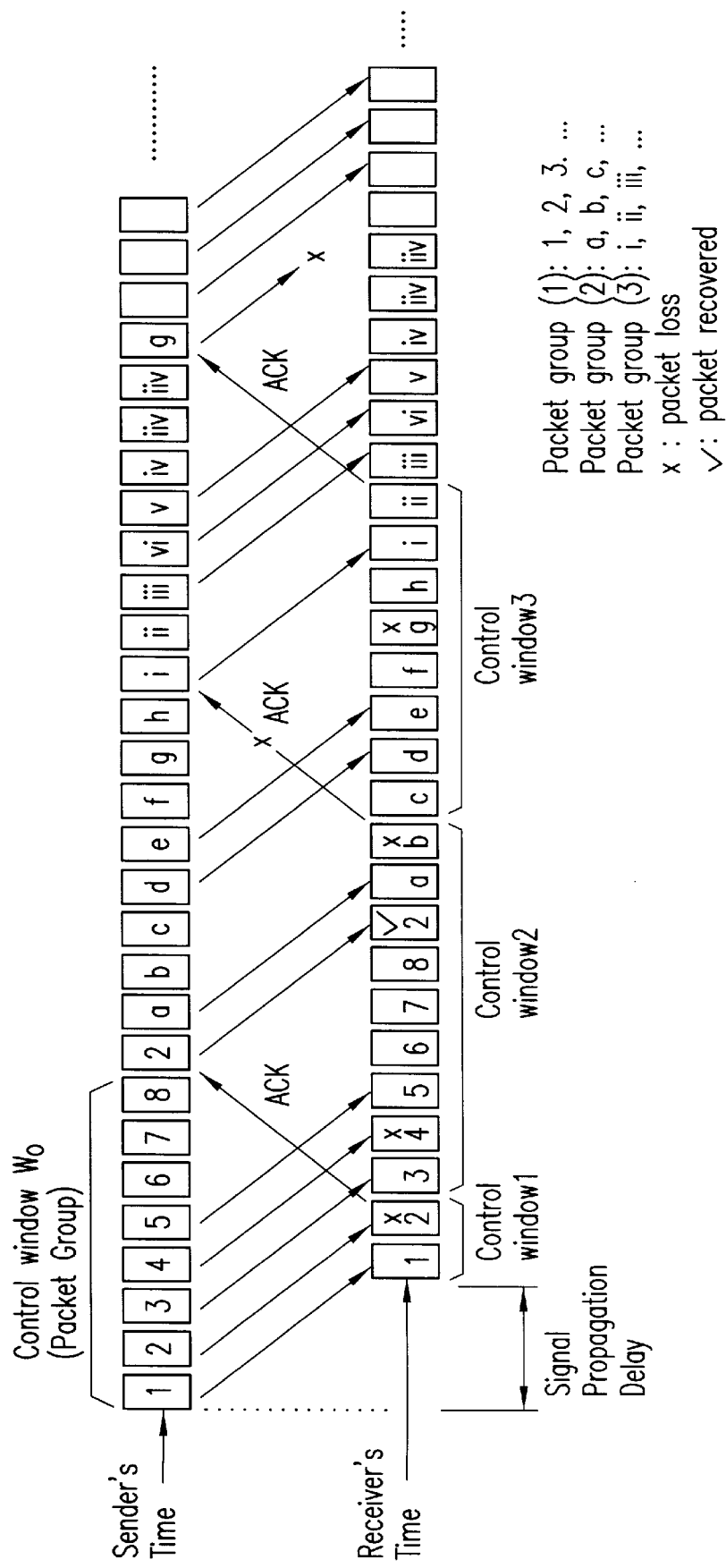
FIG. 1 illustrates an example of the BTTR protocol in accordance with the present invention.

An example showing the transmission of a burst is given in FIG. 1. There are multiple control windows $W_o$ (one GOP) used for error status observation at the receiver during this illustrative burst. Let all packets have the same packet length. In this example, the control window $W_o$ is 8 PTTs. The first three GOPs are: GOP1 with packets 1, 2, 3, . . . , GOP 2 with packets a, b, c, . . . , and GOP3 with packets i, ii, iii, . . . etc. We also assume that the signal propagation delay equals 3 PTTs. Thus, the receiver will send an ACK packet after the arrival of the 2nd packet in each GOP, such that the ACK packet will be received right before the transmitter sends the next GOP. In the first control window, packet 2 is found to have an error and thus it is retransmitted before its sending the next GOP. In the second control window, packets 4 of GOP1 and b of GOP2 should be retransmitted. However, since the only allowed ACK packet has already ben transmitted, packets 4 and b are considered as lost packets. In the third control window, note that retransmitted packet g contains an error again (after the ACK packet indicated the original error in packet g) and thus it too is lost in this burst. Accordingly, packets can be lost due to the lack of more than one ACK packet per control window and lost due to retransmitting an error packet with another error packet. However, the lost packets have been determined to be acceptable.

The Retransmission Method

Let $p_1, p_2 \ldots p_n$, represent the group of packets sent within the control window $W_o$. Then, we have $$W_o = n(PTTs) \qquad (1)$$

Assume that $W_o$ is fixed during the interval of sending a burst. As mentioned earlier, in order to have a continuous transmission between the wireless station and the fixed station, the ACK packet is required to arrive at the transmitter before the next GOP is transmitted. Due to non-negligible signal propagation delay (e.g., 3 PTTs), the receiver should send the ACK packet earlier before the arrival of the last packet $p_n$. Assume that the ACK packet should be issued earlier right after receiving the packet $p_u, u \leq n$. Let $t_p$ denote the propagation delay between the wireless station and the fixed station. Now we derive the relationship for $t_p$, n, and u as follows with respect to equations 2–5.

Figure 2A:
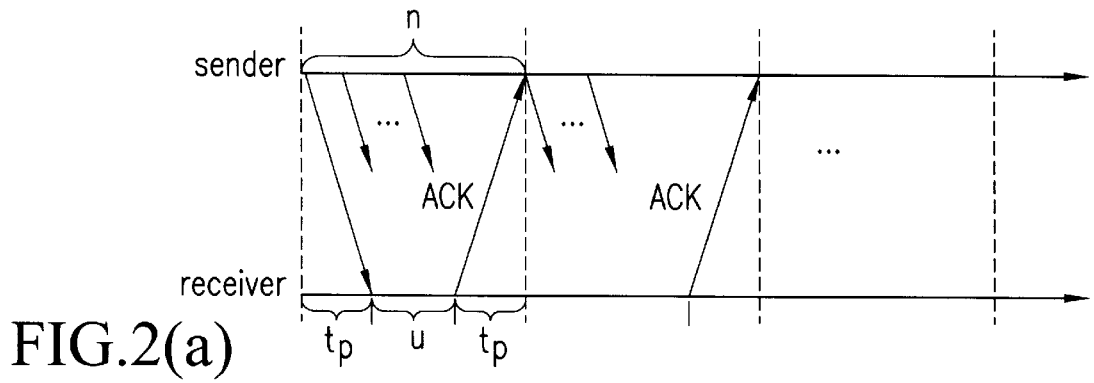
FIG. 2 graphically illustrates the retransmission method in accordance with the present invention.

In FIG. 2, three different cases for relationship of $t_p$, n, and u are shown. In FIG. 2(a), it is assumed that $0 \leq t_p \leq n/2$. Then we have $$n = u + 2 \cdot t_p \qquad (2)$$

Figure 2B:
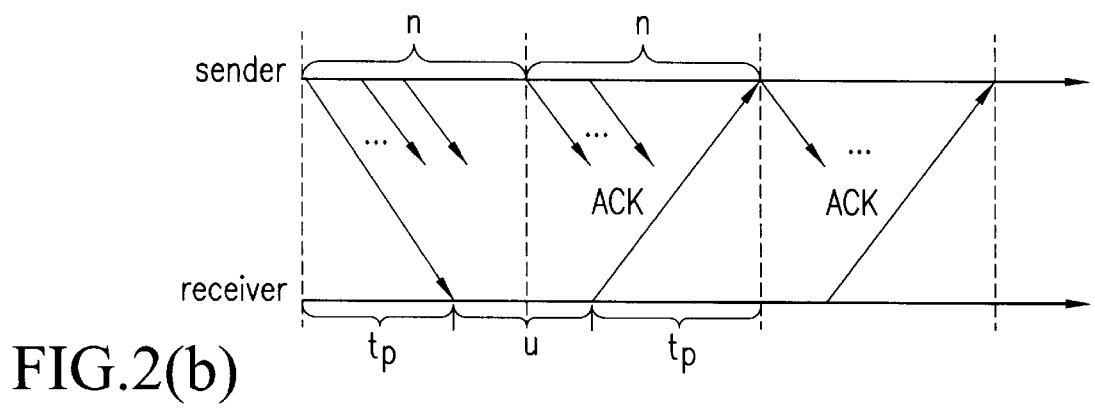

FIG. 2(b) illustrates that $n/2 \leq t_p \leq n$. Then we have $$2 \cdot n = u + 2 \cdot t_p \qquad (3)$$

Figure 2C:
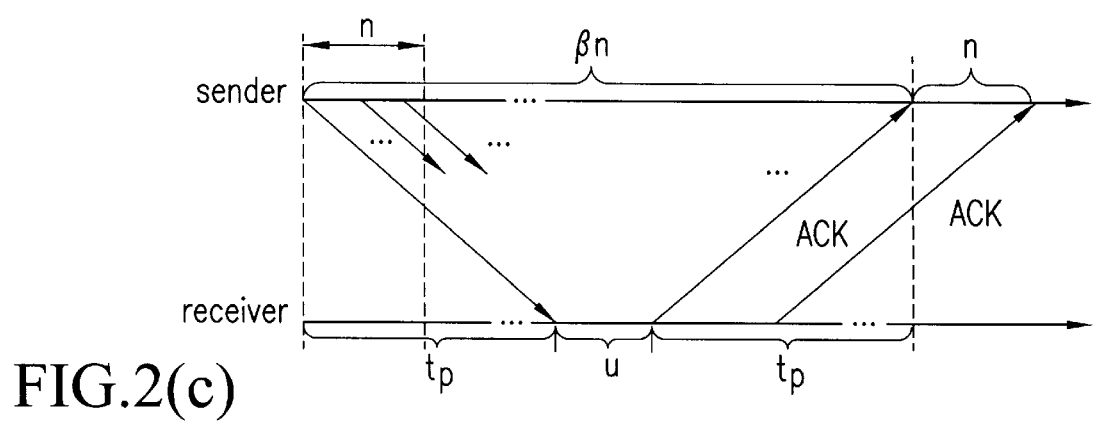

For a more generalized case, FIG. 2(c) illustrates that $$\frac{(\beta - 1) \cdot n}{2} \leq t_p \leq \frac{\beta \cdot n}{2}$$

where $\beta$ is a positive integer. Accordingly, $$\beta \cdot n = u + 2 \cdot t_p \qquad (4)$$

Hence, in general, we have the relation for $t_p$, n, and u as $$u = \beta \cdot n - 2 \cdot t_p \qquad (5)$$

At this point, the retransmission procedure algorithm will be described separately for the transmitter and receiver as follows.

The Sender Station's Process

The relatively simple process for the sender station to transmit GOPs to the receiver is as follows:

Step 1. Send the next GOP.
Step 2. If an ACK is received, send the error packet(s).
Step 3. Goto Step 1.

Figure 3A:
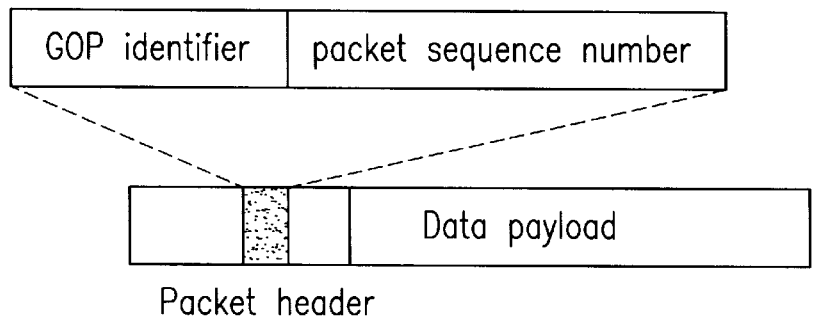
FIG. 3 illustrates a negative acknowledgement packet in accordance with the present invention.
Figure 3B:
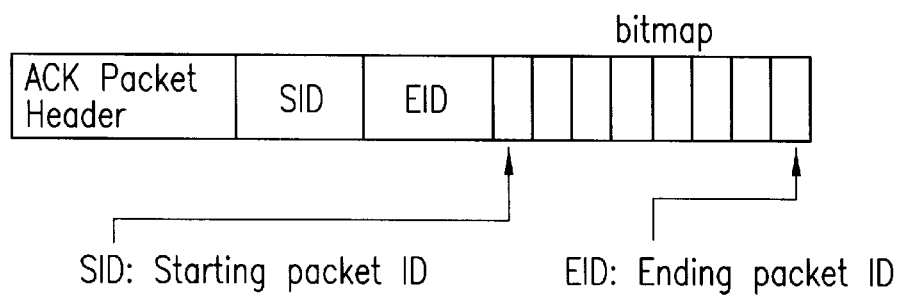

Note that in the above algorithm, it is allowable that an ACK packet does not arrive on time due to, e.g., a synchronization problem. A possible implementation is to re-synchronize those ACK packets using a small timing error, i.e., plus or minus one or two PTT. Further, we may ignore those ACK packets having a large timing error, such as more than 8 PTTs (equivalent to transmitting a GOP). In order to ensure proper synchronization, we need packet sequence information on both the data packet and the ACK packet. In the BTTR protocol, the packet sequence is represented by a pair of sequence numbers called packet identifiers which consist of a GOP identifier and packet sequence number. FIG. 3(a) illustrates a packet identifier in a data packet. For simplicity, the packet identifier is denoted as (GOP$_{\emptyset c}$, seq), where GOP_id is the GOP identifier and seq is the packet sequence number. As stated, the ACK packet is also required to carry packet identifier information in order to facilitate selective retransmission. Since the receiving status of more than one packet is to be carried in only one ACK packet, we use a bitmap approach, known in the art. In FIG. 3(b), the ACK packet has a starting packet ID (SID) and an ending packet ID (EID) for indicating the sequence range. The subfield bitmap has n or more bits, where each bit represents the status of a received packet. Note that the leftmost bit represents the status of a received packet, while the identifier SID and the rightmost bit represents the status of the packet with identifier EID.

At the receiver, an algorithm is required to control the timing of sending an ACK packet, as well as to control the receipt of new data packets. As previously stated, the receiver needs to issue an ACK packet right after receiving the u-th packet. However, it is possible that the packet u itself may be damaged, which may prohibit the receiver from sending the ACK packet. Thus, for a more reliable implementation, we may use a more robust error correction method (as is known by one skilled in the art) on the packet header. Moreover, we may utilize an ACK_countdown for greater accuracy, as described in the following method.

The Receiver Station's Process

Step 1. Set ACK_countdown=u.

Step 2. Receive a data packet,

Step 3. If the received packet is a retransmitted packet, then go to 2.

Step 4. If the received packet is a new packet, then decrement ACK_countdown,

Step 5. Let the new packet identifier (GOP_id, seq)=(i,j).

Step 6. If j=u or ACK_countdown=0, then send an ACK packet and let ACK_countdown=n.

Step 7. Go to Step 2.

Figure 4:
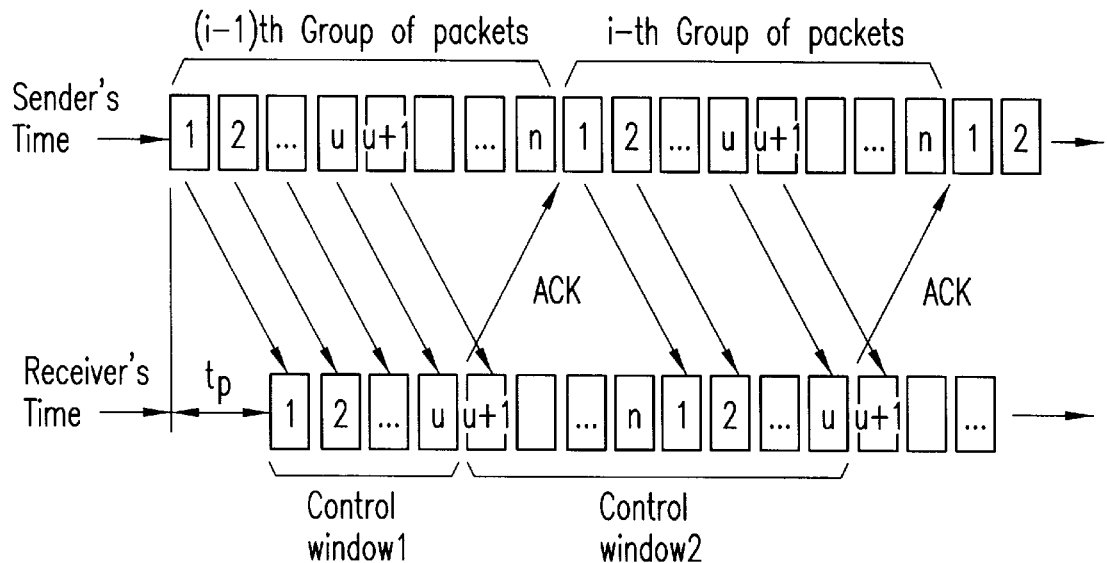
FIG. 4 illustrates the paradigm of the BTTR protocol retransmission scheme in accordance with the present invention.

As discussed, each ACK packet contains information regarding packet error indication. According to FIG. 2 and the above method, the ACK packet sent in the $i^{th}$ GOP could report the status of the packets from $p_j$ to $p_u$, which belongs to the $i^{th}$ GOP, and also to those packets from $p_u+1$ to $p_n$, belonging to the $(i-1)^{th}$ GOP. FIG. 4 illustrates the paradigm of the BTTR re-transmission scheme. At the transmitter's buffer, the data packets with a packet identifier smaller than (i,u) can be removed from the buffer after the corresponding ACK is received and processed. Remember that in the BTTR scheme, the ACK packet is sent only once for each $W_o$ period. Thus, data packets having a packet identifier smaller than (i,u) can be removed regardless of whether the retransmitted packets were received by the receiver or not. This is important since the transmission buffer of a wireless station is limited.

To summarize the BTTR protocol, if a burst is transmitted without any data packet errors, the data packets of a GOP are transmitted consecutively without interruption. However, if a burst is transmitted with a data error, then the transmission of the packets will be stopped temporarily by transmitting an ACK packet. Note that the delay is small since the ACK packet is sent only once (if at all) per GOP. The required transmitting and receiving buffer at both the sender and receiver, respectively, remains small as compared with the burst length, as will be discussed below.

The Sender Station Buffer Size

The BTTR protocol is designed for, but not limited to, wireless communications, especially for mobile stations with limited processing power. Thus, it is a priority to minimize the number of states, as well as to minimize the use of resources, such as the transmission and receiving buffers. The maximum buffer size required at the transmitter can be determined by n and $t_p$ and is independent of the burst size $W_b$. Referring back to FIG. 4, after sending the (i-1)th GOP, the transmitter receives an ACK packet containing the status of data packets that have identifiers earlier than (i-1, u+1). Thus, it can delete packets $p_1, p_2 \ldots, p_u$ from the buffer, while maintaining n-u data packets in the buffer. The sender will then wait another n packets of time (equal to $W_o$) to get another ACK packet. Since there is only one opportunity per control window to retransmit corrupt packets, the transmitter will need at most n+n-u=2·n-u packet space in the transmission buffer. Returning to Equation (2), we have u=n-2·$t_p$. Thus, the required transmission buffer would be $$2 \cdot n - u = n + 2 \cdot t_p \quad (6)$$

In a more generalized case, such as in FIG. 2(c), the transmitter should wait for another βGOPs before another ACK packet is received. Therefore, the transmitter will need at most (β+1)·n-u packet space for transmission buffer. From Equation (5), we have $$(\beta+1) \cdot n - u = (\beta+1) \cdot n - \beta \cdot n + 2 \cdot t_p = n + 2 \cdot t \quad (7)$$

Receiving Buffer Size

At the receiver, the maximum buffer size is also determined by n and $t_p$. At first, the receiver sends an ACK packet, after receiving u packets, containing the status of the data packets before $p_{u+1}$. If, in the worst case, the next incoming packet $p_{u+1}$ has an error, than any non-erroneous data packets having a sequence number after $p_{u+1}$ cannot be removed before the retransmitted packet(s) arrive. However, the retransmitted packet will be triggered by the next ACK packet sent immediately after n packet time. The receiver should wait for another n packet time to allow for the possible arrival of a new retransmitted packet. Since there is only one chance for packet retransmission, the receiver will also need at most 2·n-u packet space for the receiver buffer.

PERFORMANCE ANALYSIS

Out-of-Sequence Probability

The performance of the inventive BTTR protocol will be analyzed for transmission throughput, delay, and packet drop rate in a burst. The error status of the receiver is reported in every control window, that is, the receiver will check whether there is any packet out of sequence when $W_o$ packets are received. Thus, we need to know the probability of encountering data packets out-of sequence for each control window. Let X represent the size of control window L and the number of packets which cause an out-of-sequence pattern. Then the probability of finding an out-of-sequence pattern at the time of sending the ACK packet is $$Pr\{L \leq n | X = n\} = \sum_{i=1}^{n} Pr\{L = i | X = n\}$$

It is known that the wireless link will have a bursty bit error pattern, that is, the data burst will fluctuate between good and bad states. For simplicity, let p denote the average packet error caused by the bit errors. Also, let the function f(n,k) represent the probability $Pr\{L=k|X=n\}$, i.e., $$f(n, k) + Pr\{L=k|X=n\}$$

Figure 5:
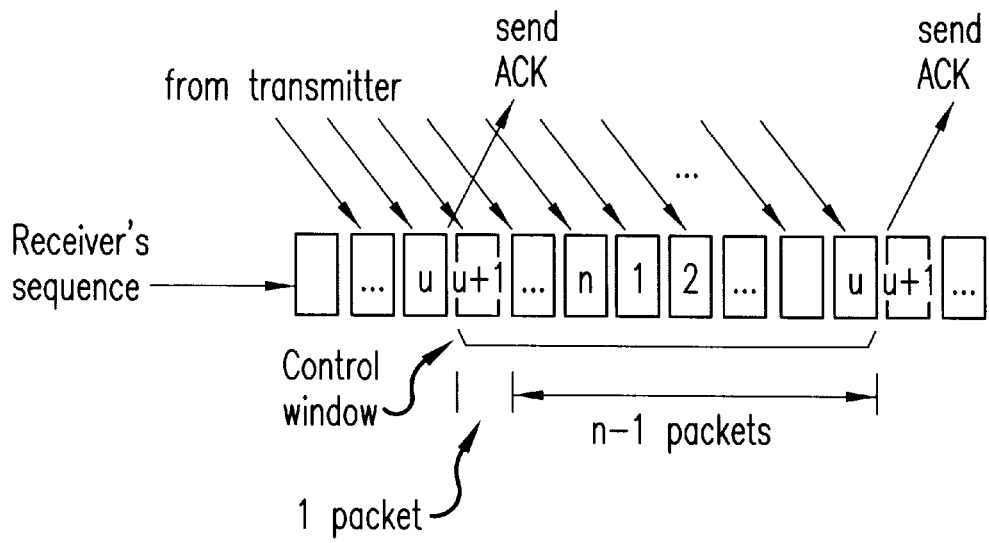
FIG. 5 illustrates the paradigm of BTTR protocol out-of-sequence probability in accordance with the present invention.

To calculate f(n,k), we consider the first of the n packets between two transmitted ACK packets, i.e., $p_{u+1}, p_{u+2}, \ldots, p_u$, as shown in FIG. 5. Since f(n,k) represents the probability for having k error packets out of n packets, it equals to the summation of two conditions as follows. In the first condition, the first packet $p_{u+1}$ has an error. Then, there must be (k-1) packets having errors out of the other (n-1) packets. In the second condition, the first packet is correct. Then, there must be k packets having errors out of the other (n-1) packets. Since p is the average packet error rate, we derive f(n,k) by the above two conditions as follows $$f(n,k)=p \cdot f(n-1, k-1)+(1-p) \cdot f(n-1, k) \quad (8)$$

When k=1, the function f(n,1) can be represented as follows $$f(n, 1) = \binom{n}{1} \cdot p \cdot (1-p)^{n-1} - p \cdot (1-p)^{n-1} \quad (9)$$

$$= (n-1) \cdot p \cdot (1-p)^{n-1}$$

Note that in the above case, it is not an out-of-sequence pattern when the last packet (packet u in FIG. 5) has not yet arrived or has an error. As stated, there are delay variances when transmitting the packets. It is possible that the status of packet u is still unknown when ACK_countdown=0 (when the ACK packets is transmitted). For simplicity, we will assume that a packet is correct when its status is still unknown at the time of ACK_countdown=0. Then f(n, 1) will be represented by Equation (9) instead of $p \cdot (1-p)^{n-1}$. To calculate f(n,k), we start from calculating f(n,2) by using the recursive definition of Equation (8), and list an array of equations as follows.

$$f(n, 2) = p \cdot f(n-1, 1) + (1-p) \cdot f(n-1, 2)$$

$$f(n-1, 2) = p \cdot f(n-2, 1) + (1-p) \cdot f(n-2, 2) \ldots \times (1-p)$$

$$f(n-2, 2) = p \cdot f(n-3, 1) + (1-p) \cdot f(n-3, 2) \ldots \times (1-p)^2$$

$$f(n-3, 2) = p \cdot f(n-4, 1) + (1-p) \cdot f(n-4, 2) \ldots \times (1-p)^3$$

$$f(3, 2) = p \cdot f(2, 1) + (1-p) \cdot f(2, 2) \ldots \times (1-p)^{n-3}$$

By taking the summation of the above equations, we derive f(n,2) as follows.

$$f(n, 2) = p \cdot \left( \sum_{i=1}^{n-2} (1-p)^{i-1} \cdot f(n-i, 1) \right) + (1-p)^{n-2} \cdot f(2, 2) \quad (10)$$

From Equation (9), we have $$f(n, 2) = p^2 \cdot (1-p)^{n-2} \cdot \frac{(n-1)(n-2)}{2} + (1-p)^{n-2} \cdot f(2, 2) \quad (11)$$

Using the same approach, we have f(n,3) as follows.

$$f(n, 3) = p^3 \cdot (1-p)^{n-3} \cdot \frac{(n-1)(n-2)(n-3)}{6} + \quad (12)$$
$$(n-3) \cdot p \cdot (1-p)^{n-3} \cdot f(2, 2) + (1-p)^{n-3} \cdot f(3, 3)$$

To derive f(n,k) we assume $$f(n, k) = p^k \cdot (1-p)^{n-k} \cdot \frac{\prod_{j=1}^{k}(n-j)}{k!} + \quad (13)$$
$$\left( \prod_{j=3}^{k}(n-j) \right) \cdot p^{k-2} \cdot (1-p)^{n-k} \cdot f(2, 2) +$$
$$\left( \prod_{j=4}^{k}(n-j) \right) \cdot p^{k-3} \cdot (1-p)^{n-k} \cdot f(3, 3) +$$
$$\left( \prod_{j=k}^{k}(n-j) \right) \cdot (1-p)^{n-k} \cdot f(k-1, k-1) +$$
$$(1-p)^{n-k} \cdot f(k, k)$$

When k=k+1, we may derive f(n,k+1) from Equation (8) as follows.

$$f(n, k+1) = p \cdot f(n-1, k) + (1-p) \cdot f(n-1, k+1) \quad (14)$$

From Equations (13) and (14), we have $$f(n, k+1) = p^{k+1} \cdot (1-p)^{n-k-1} \cdot \frac{\prod_{j=1}^{k+1}(n-j)}{(k+1)!} + \quad (15)$$
$$\left( \prod_{j=3}^{k+1}(n-j) \right) \cdot p^{k-1} \cdot (1-p)^{n-k-1} \cdot f(2, 2) +$$
$$\left( \prod_{j=4}^{k+1}(n-j) \right) \cdot p^{k-2} \cdot (1-p)^{n-k-1} \cdot f(3, 3) +$$
$$\left( \prod_{j=k+1}^{k+1}(n-j) \right) \cdot p^{1} \cdot (1-p)^{n-k-1} \cdot f(k, k) +$$
$$(1-p)^{n-k-1} \cdot f(k+1, k+1)$$

By mathematical induction, we have proved that Equation (13) is true when k is a positive integer from Equation (15).

BTTR Performance

Packet Drop Rate

We observe the average packet drop rate, PDR, in a single burst. Let the burst length be N and control window size $W_o = n$. In each control window, if there are i packets having errors, then there are two cases regarding the ACK packets. First, if the ACK packet is lost, then i packets will be dropped. Second, if the ACK packet is correct, then in average, there will i·p packets having errors during their retransmission. Also assume the ACK packet error rate is $p^*$. Then we have the average packet drop rate as $$PDR = \frac{\sum_{i=1}^{n-1} f(n, i) \cdot (p^* \cdot i + (1-p^*) \cdot i \cdot p)}{n} \quad (16)$$

When $p^* = p$, then we have $$PDR = \frac{\sum_{i=1}^{n-1} f(n, i) \cdot (p \cdot i + (1-p) \cdot i \cdot p)}{n} \quad (17)$$

Latency

The latency LT, inherent in sending a burst via a wireless system, includes propagation delay and additional packet retransmission delay. As the name suggests, additional packet retransmission delay refers to the delay caused by re-transmitting erroneous data packets, when necessary. Specifically, in each control window, if there are i packets having errors, then there will be an additional delay in re-sending these i packets, under the condition that the ACK packet is received. Thus, the expected average delay for retransmitting the error packets in a control window would be $$\sum_{n=1}^{i=1} f(n, i)(1-p^*) \cdot i$$

Thus, the overall latency of sending a burst would be $$LT = \left( \frac{N}{n} \cdot \sum_{i=1}^{n-1} f(n, i)(i-p^*) \cdot i \right) + t_p \quad (18)$$

Throughput

The effect throughput TH of sending a burst is the ratio of the average number of transmitted packets to the average delay in transmitting these packets. That is, $$TH = \frac{N \cdot (1 - PDR)}{LT} + N \qquad (19)$$

Comparison

BTTR will now be compared with a more robust conventional positive ACK SR-ARQ method, that is not capable of real-time multimedia transmission. In the literatures, high-throughput protocols have been well-studied on low-error links. Many ARQ schemes had been proposed for various applications, such as ARQ on Frequency-Hopped channel, improved Go-back-N for satellite communication, hybrid ARQ/FEC for wireless, selective ARQ for cellular radio link, and ARQ performance analysis. Among them, the Radio Link Protocol (RLP) in is used in U.S. digital cellular TDMA standard. It is a reliable protocol and performs well with novel selective retransmission mechanisms, grouped ACK feedback and preemptive retransmission schemes all for non-real time applications. Thus, the robust RLP will be compared to the inventive BTTR protocol to set the benchmark.

Stop-and-Wait Radio Link Protocol

Figure 6:
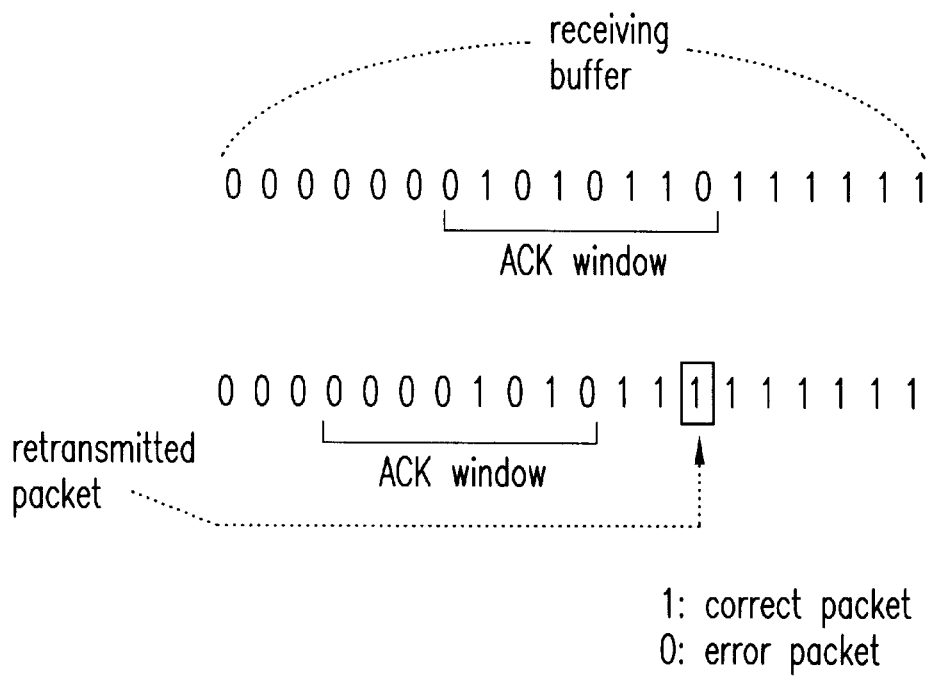
FIG. 6 illustrates the sliding ACK window for a conventional RLP.

As with the BTFR protocol, RLP also sends ACK packets after receiving a group of packets. We refer to the length of this group of packets as the ACK control window. If an out-of-sequence pattern occurs, then an ACK packet having a status bitmap will be sent to call for retransmission. However, RLP uses a complex sliding control window such that the control of received ACK packets will be more efficient. At the receiving station, the ACK control window will move forward in a packet-by-packet basis and stop at the first packet which is incorrectly received, as shown in FIG. 6. The ACK control window will not move forward unless the incorrect packet has been correctly recovered. After a period of time, e.g., a timeout occurs, another ACK packet will be transmitted. At the transmitter, a mechanism called preemptive retransmission is used when the transmitter is waiting for further ACK packets. The transmitter will be forced to be in an idle state when no further ACK packet has arrived. The preemptive retransmission allows the idle transmitter to retransmit the non-ACK (i.e. data) packets in multiple copies with a hope that the error will be recovered quickly.

Although in this analysis, we will analyze the performance of the RLP vis-a-vis the inventive BTlR protocol, it is very difficult to analyze RLP with its sliding ACK window and preemptive retransmission by mathematics. For simplicity, we will analyze the "stop-and-wait" version of RLP having a control window that only slides forward by moving from one GOP to the next, instead of sliding forward on a packet-by-packet basis. Also, in stop-and-wait RLP, the preemptive retransmission is inactive.

Latency

Let control window size be equal to n. Thus, we know that the transmission/receiving buffer required at the both stations will be n. For a fair comparison, we will analyze the latency for sending a burst of N packets.

Within each control window of size n, the probability that there is are i packets causing an out-of-sequence pattern is f(n,i) and thus an ACK packet will be sent. If the ACK packet is correctly received, then it needs to wait for another iPITs to receive the retransmitted packets. However, it is possible that some of the retransmitted packets still contain errors. Therefore, a second ACK feedback will be sent, and if there are still errors, a third ACK packet will be sent, and so on until all the errors are corrected or a timeout occurs. Since the average packet error rate is p, it is assumed that there will be $i \cdot p$ packets that will require two times retransmission, and $i \cdot p^2$ packets that will require the three-times retransmission. Thus, under the condition that the ACK packet is received correctly, the expectation of the average latency caused by the above retransmission can be represented by $$(1-p) \cdot i + (1-p) \cdot i \cdot p + (1-p) \cdot i \cdot p^2 + (1-p) \cdot i \cdot p^3 + \ldots = \qquad (20)$$

$$(1-p) \cdot i \cdot \frac{1}{1-p} = i$$

In case that the ACK packet itself contains an error, the sender cannot recognize the ACK packet message and thus will not re-send the packet(s). Then, the receiving station will send another ACK packet after a timeout and wait to recover the retransmitted packets once again. Usually, this kind of retry will be done several times until the receiver decides to give up or all the packets have been corrected. Let's conservatively assume that the timeout value to be the round-trip propagation delay, which is $2 \cdot t_p$. Then the expectation of the additional latency for this case would be $$p \cdot 2 \cdot t_p + p \cdot (1-p) \cdot 2 \cdot t_p + p \cdot (1-p)^2 \cdot 2 \cdot t_p + \ldots = \qquad (21)$$

$$p \cdot 2 \cdot t_p \cdot \frac{1}{1-1+p} = 2 \cdot t_p$$

Thus, the latency of the stop-and-wait RLP for control window of n is $$\sum_{i=1}^{n-1} f(n, i) \cdot (i + 2 \cdot t_p) \qquad (22)$$

For comparison, we need to calculate the latency of sending N packets, denoted as $LT_{SW}$. That is $$LT_{SW} = \left( n + t_p + \sum_{i=1}^{n-1} f(n, i) \cdot (i + 2 \cdot t_p) \right) \cdot \frac{N}{n} - N \qquad (23)$$

Throughput

The throughput of the stop-and-wait RLP, denoted by $TH_{SW}$, is simply $$TH_{SW} = \frac{N}{LT_{SW} + N} \qquad (24)$$

Conclusions

We evaluate the performance by calculating f(n,k) using Equation (13). The control window size n is set to 5PTTs, 10PTTS, and 30PTTs. The burst size N is set to 60 and 480, respectively. The propagation delay $t_p$ is set to 1PTT, 5PTTs, 10PTTs respectively.

Figure 7:
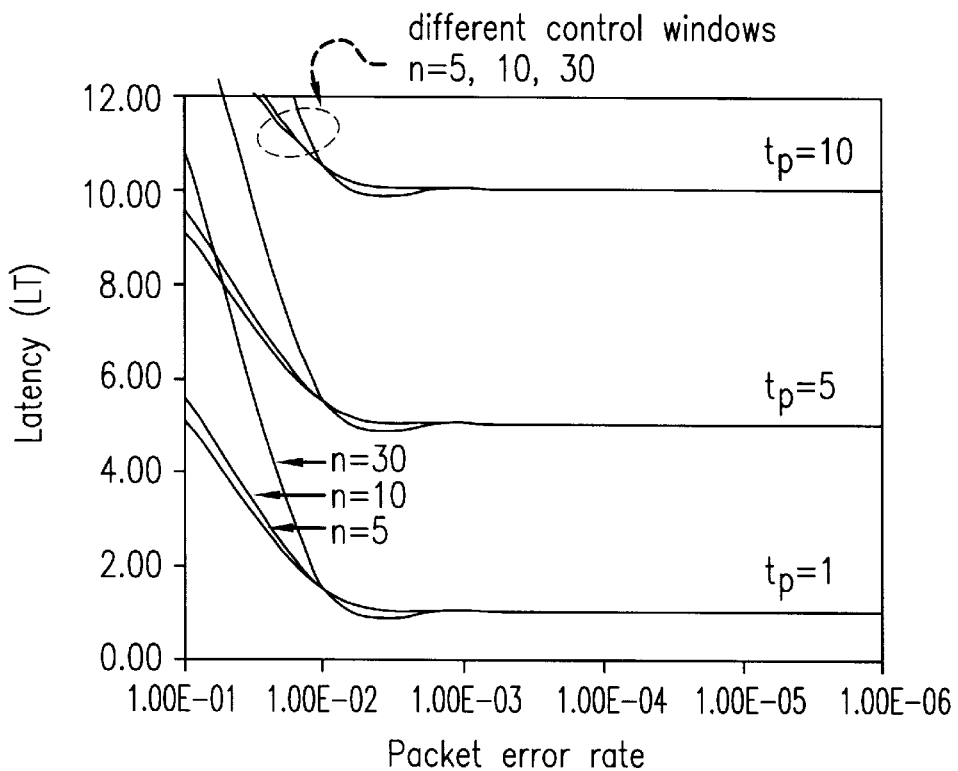
FIG. 7 graphically illustrates the packet drop rate for a conventional RLP.

In FIG. 7, the packet drop rate (PDR) is plotted. It is found that using different control windows n does not make a big performance difference on PDR. It also shows that PDR is approximately equal to $p^2$. Compare this to the similar results in FIG. 8 (plotting the packet drop rate for BTTR at a burst length N=60) and it shows that the inventive BTTR protocol achieves good performance with respect to the packet drop rate even utilizing time-bounded retransmission.

Figure 8:
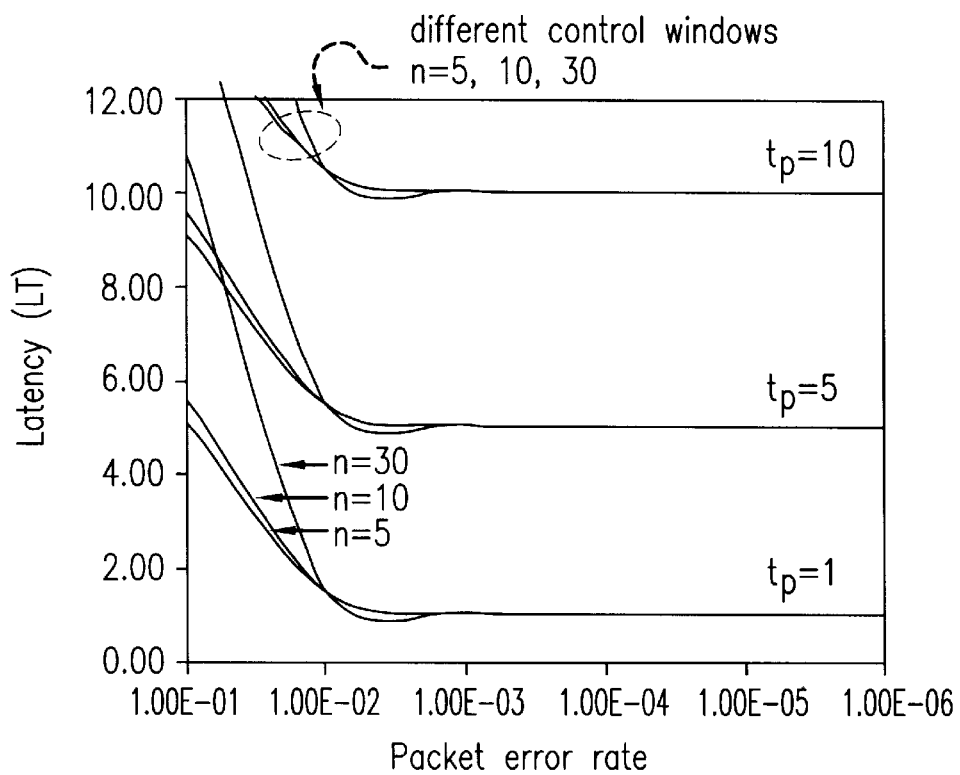
FIG. 8 graphically illustrates the latency of the BTTR protocol having a burst length of 60 packets in accordance with the present invention.
Figure 9:
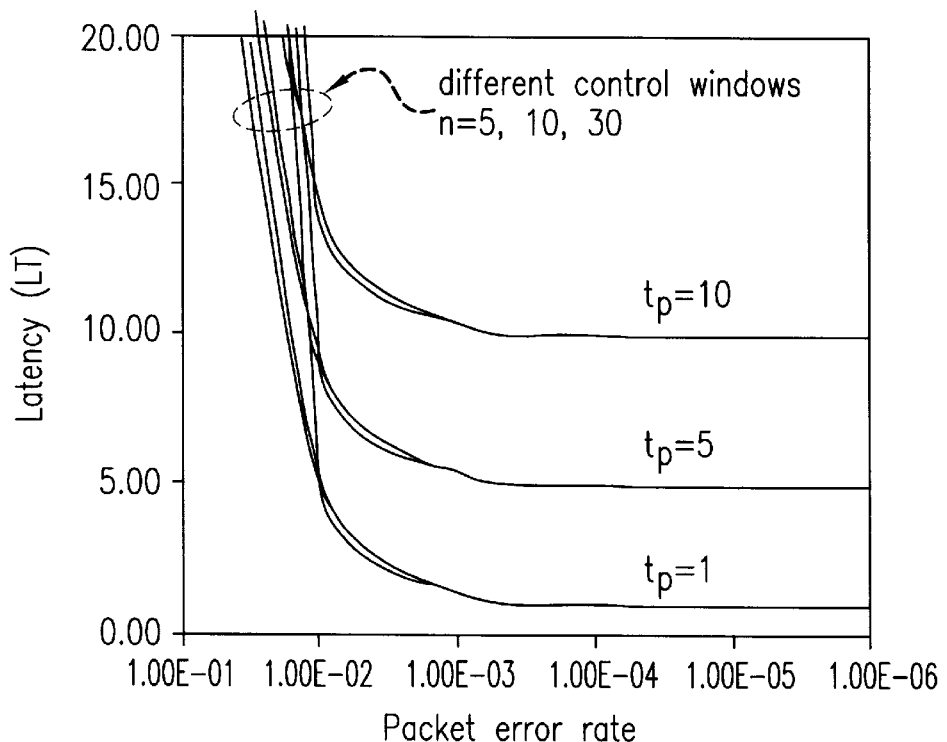
FIG. 9 graphically illustrates the latency of the BTTR protocol having a burst length of 480 packets in accordance with the present invention.

In FIGS. 8 and 9, the latency LT is plotted for different burst lengths of N=60 and 480, respectively. It is found that the LT has a steady performance close to the value $t_p$ when the packet error rate p is smaller than $10^{-2}$. This means that the burst of data can be transferred without additional latency under a very limited transmission and receiving buffer. For example, when $t_p$=5PTTs and N=480, the transmission buffer is 10, 15, 35 for n=5PTTs, 10PTTs, 30PTTs respectively.

Figure 10:
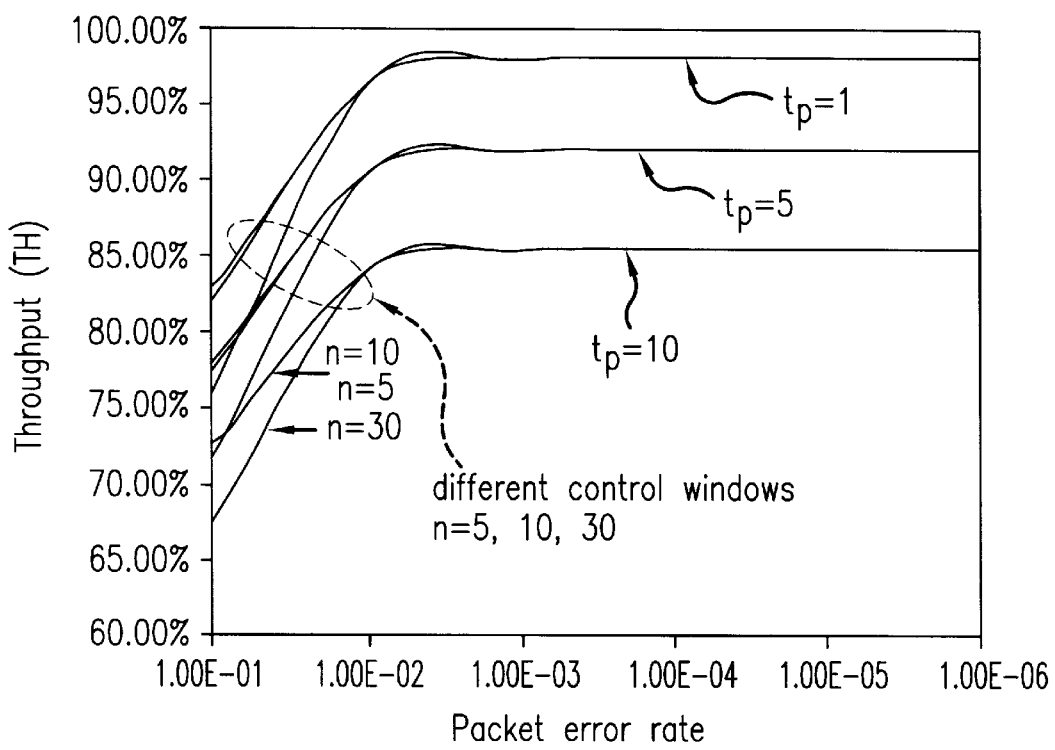
FIG. 10 graphically illustrates the throughput of the BTTR protocol having a burst length of 60 packets in accordance with the present invention.
Figure 11:
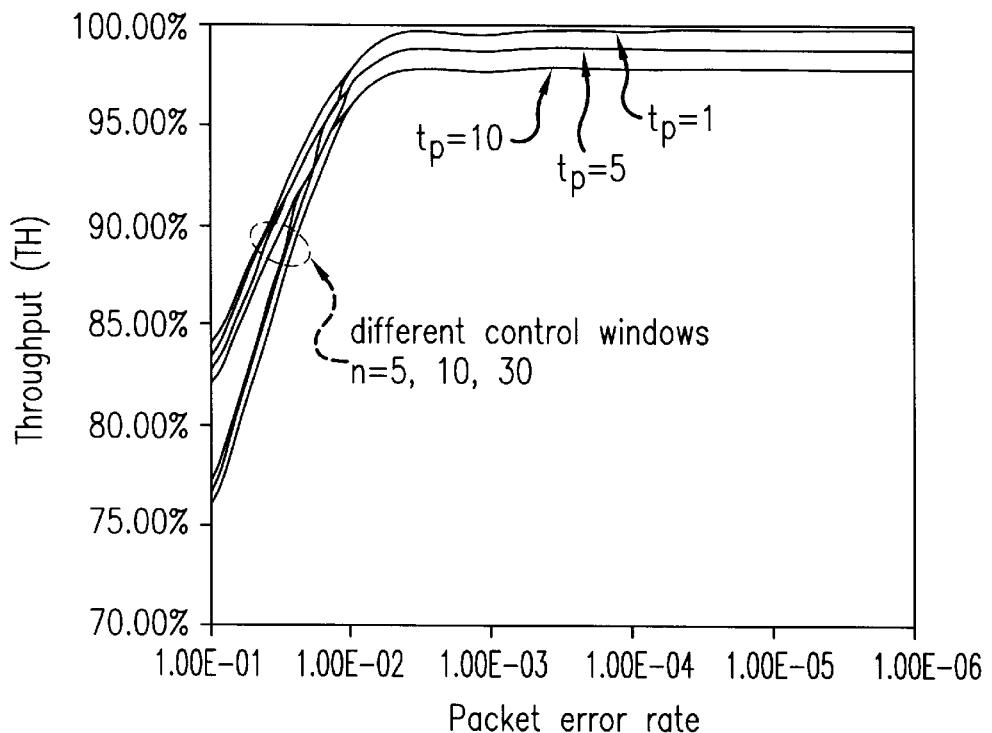
FIG. 11 graphically illustrates the throughput of the BTTR protocol having a burst length of 480 packets in accordance with the present invention.

In FIGS. 10 and 11, the throughput TH is plotted for different burst lengths of N=60 and 480, respectively. It is found that a large burst length can reduce the effect of $t_p$. However, even in a short burst length, a throughput of 85% is still achieved for packet error rate lower or near $10^{-2}$. For a long burst length (N=480), a throughput of higher 95% can be achieved even when $t_p$ is very large ($t_p$=10PTTs).

Note that in the results, the variation of the control window size n does not make significant effect on the performance when packet error rate is lower that $10^{-2}$. When packet error rate is greater than $10^{-2}$, however, a small control window will perform better. For example, in FIG. 8 when $t_p$=1, the latency is about 11PTTs for n=30 and is about 5PTTs for n=5 at packet error rate of $10^{-1}$. This is because a smaller control window will create more opportunities for error checking and retransmission. Further, the out-of-sequence probability within a large control window is higher, thus providing a longer latency. To summarize, the BTTR scheme performs steadily well when the average packet error rate is low or moderate. As the higher packet error rate (i.e., $10^{-1}$), the BTTR scheme performs well with smaller control window. In addition, a longer burst length will achieve a higher performance. Therefore, to adjust or tune the performance under various packet error rates, simply adjust the burst length.

Figure 12:
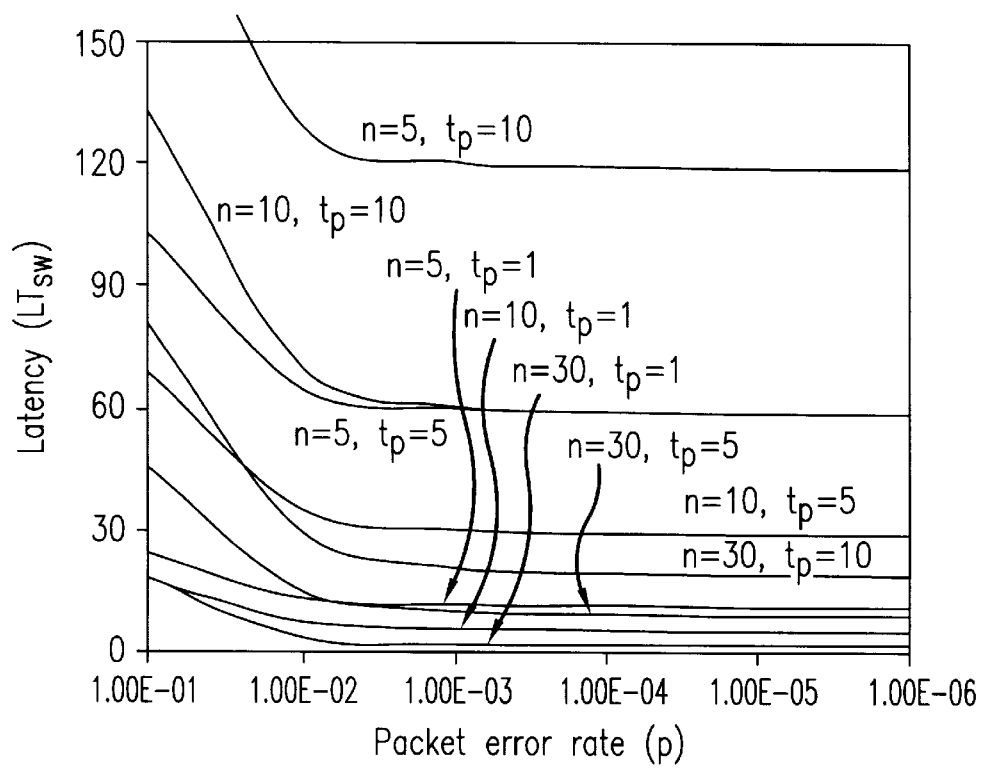
FIG. 12 graphically illustrates the latency of the conventional RLP having a burst length of 60 packets.
Figure 13:
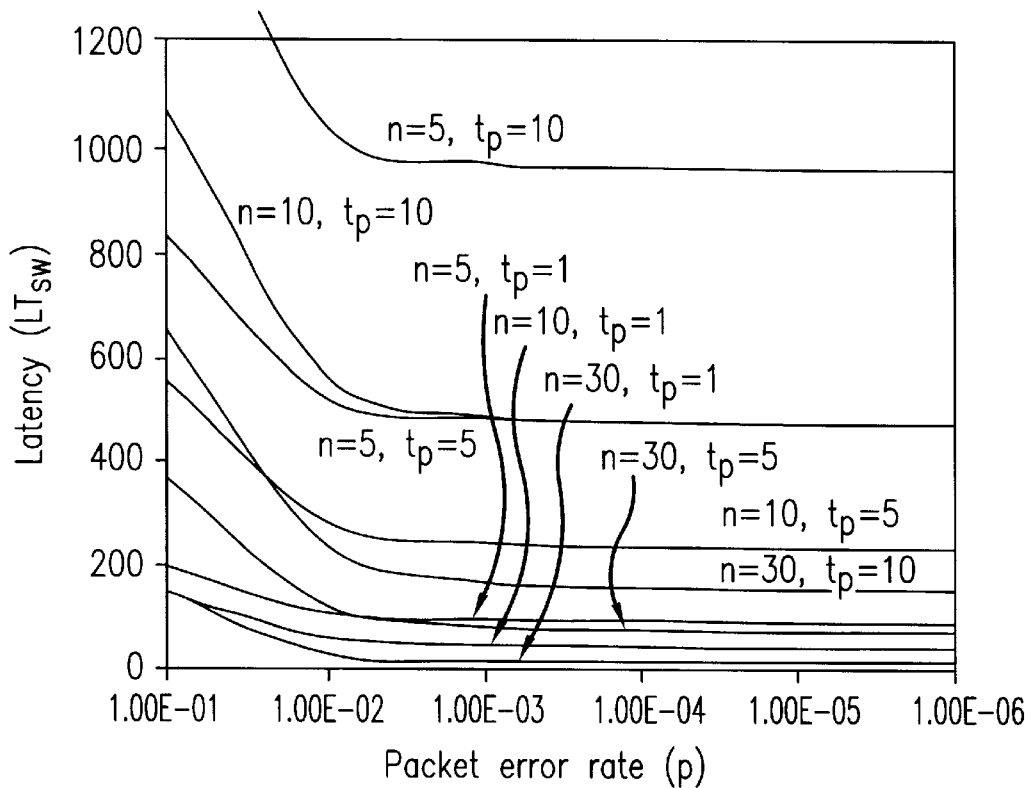
FIG. 13 graphically illustrates the latency of the conventional RLP having a burst length of 480 packets.

The performance of the stop-and-wait RLP is illustrated in FIGS. 12 to 15. In FIGS. 12 and 13, the latency performance is shown having different burst lengths of N=60 and 480, respectively. It is found that the performance is strongly affected by the value $t_p$ and n. Normally, a larger control window size n will result in better performance, which implies a larger transmission and receiving buffer space is required. This can be explained as follows. We have noted that a larger control window will suffer from a higher probability of an out-of-sequence pattern. However, the stop-and-wait RLP is designed to have virtually error-free transportation. A smaller control window will break the burst of transmission into multiple smaller bursts and each smaller burst will perform substantially error-free transmission. Also note that the scheme performs better under a smaller $t_p$, due to the fact that the error recovery process is strongly affected by the value of $t_p$. A larger burst length (which inherently will contain more control windows within it) will result in a longer latency given that the control window size and $t_p$ are fixed.

Figure 14:
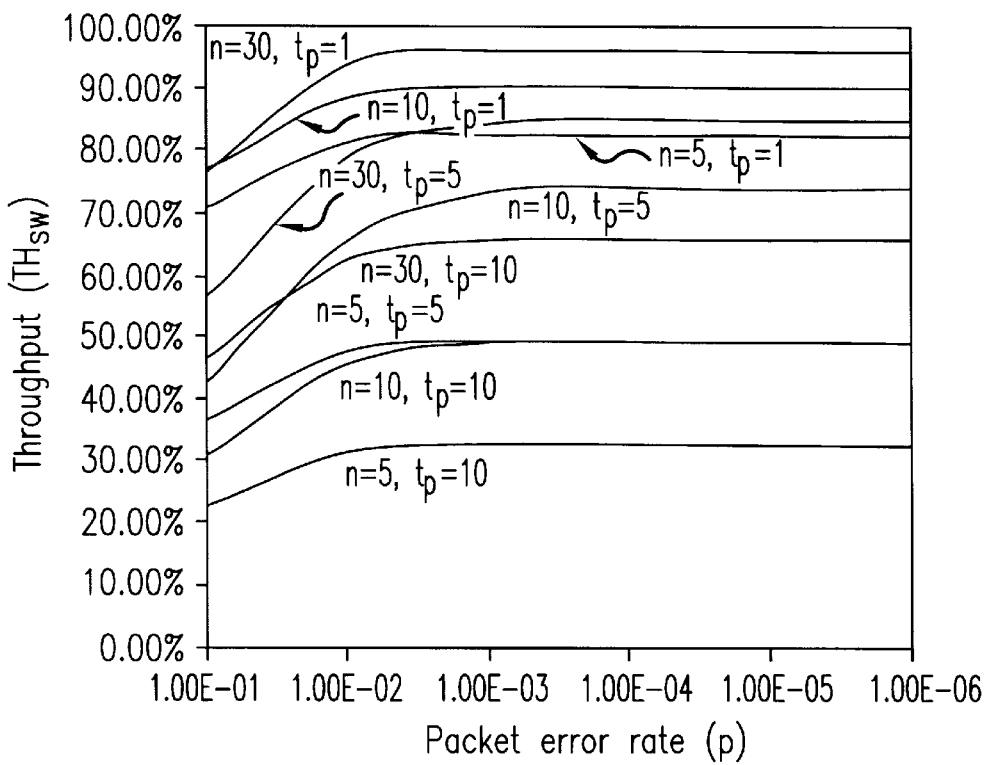
FIG. 14 graphically illustrates the throughput of the conventional RLP having a burst length of 60 packets.
Figure 15:
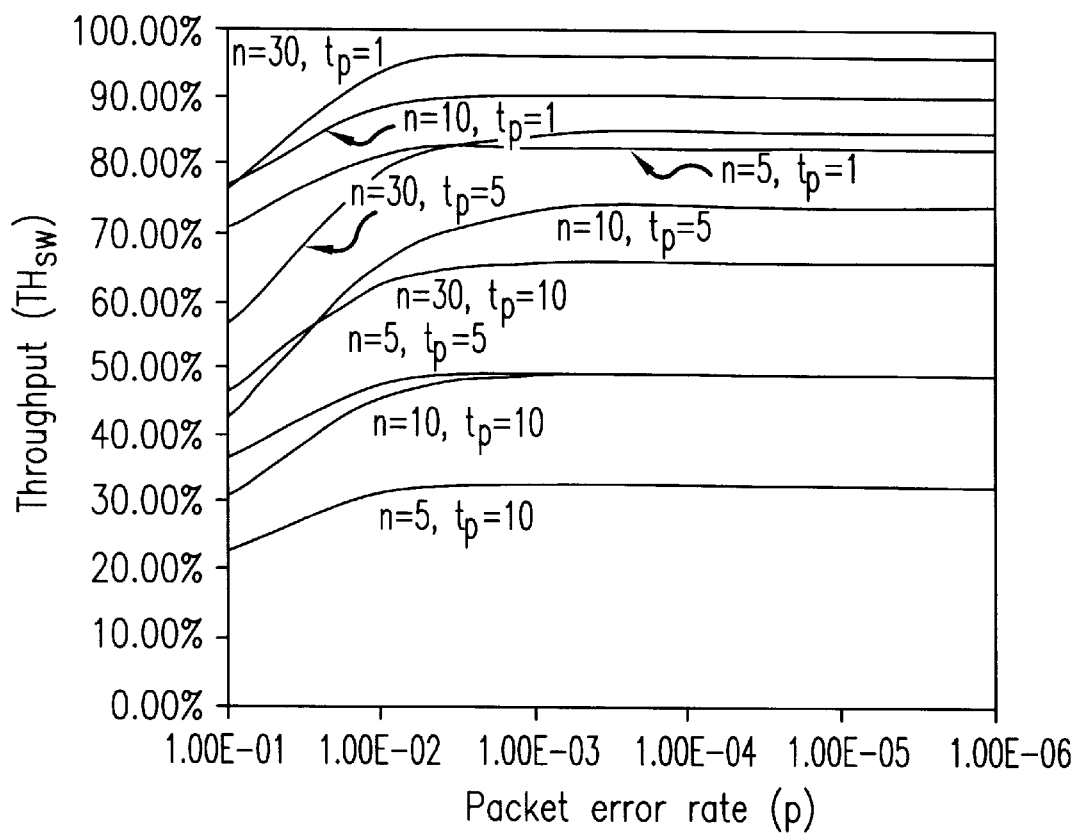
FIG. 15 graphically illustrates the throughput of the conventional RLP having a burst length of 480 packets.

In FIGS. 14 and 15, the throughput performance of the stop-and-wait RLP is shown having different burst lengths of N=60 and 480, respectively. The results are very similar to that for the latency. Note that the performance for different burst lengths is very similar. This is due to the independent error recovery process within each control window.

It is important to note that in the BTTR protocol, the required transmission buffer is n+2·$t_p$, while the required buffer size in the stop-and-wait RLP is only n. Accordingly, it is somewhat unfair to compare both protocols. However, the two protocols may still be observed from the above result. For example, when $t_p$=10 and n=10, the BTTR throughput is around 85% at packet error rate of $10^{-2}$, as shown in FIG. 10. In this case, BTTR transmitter requires a buffer of 30. Compare this to FIG. 14 illustrating the RLP throughput which is around 60% for n=30 and $t_p$=10.

The BTTR protocol uses time-bounded retransmission constraints and burst-oriented transmission, which is shown to be able to satisfy the requirements of real-time applications, such as video and voice, transmissions. Meanwhile, the latency and throughput performance achieves a greater than acceptable level. Another advantage of using the inventive BTTR protocol is that the transmission and receiving buffer can be far smaller than the burst length.

Finally, the above-discussion is intended to be merely illustrative of the invention. Numerous alternative embodiments may be devised by those having ordinary skill in the art without departing from the spirit and scope of the following claims.

What is claimed is:

1. A transport protocol process for transmitting data from a sending station to a receiving station over a wireless link, wherein said protocol prohibits using positive acknowledgement (ACK) packets, said process comprising the steps of:

transmitting, by said sending station, a plurality of sequential data packets to said receiving station, wherein each said plurality of sequential data packets form a respective Group-of-Packet (GOP);

detecting whether any of said received data packets in each current GOP are corrupted before receipt of all data packets in said current GOP;

transmitting, by said receiving station, a negative acknowledgement (NAK) packet to said sending station, before the receipt of all data packets in said current GOP, only if at least one of said data packets in said current GOP is corrupted, wherein said NAK packet indicates corrupted data packets; and selectively transmitting, by said sending station, said data packets indicated by the received NAK packet before transmitting the next GOP to said receiving station if a predetermined time is unexpired, wherein the prohibition of said ACK packets reduces data propagation delays.

2. The process of claim 1, wherein said step of detecting detects corrupted data packets the step of analyzing all data packets in a buffer of said receiving station once every predetermined time period.

3. The process of claim 2, wherein said predetermined time period equals time required to transmit a complete GOP.

4. The process of claim 1, wherein said NAK packet comprises a GOP identifier and a packet sequence number to indicate which data packets in which GOPs contain corrupted data.

5. The process of claim 2, wherein said sending station includes a buffer having a storage capacity of n+(2×tp) packets, where n equals the number of packets in a GOP, and tp equals the propagation delay.

6. The process of claim 2, wherein the receiving station buffer having a storage capacity of 2×(n−u) packets, where n equals the number of packets in a GOP, and u equals the time to transmit said NAK packet.

7. The process of claim 1, wherein the predetermined time is once.

8. The process of claim 1, wherein n equals the number of packets in a GOP and the $U^{th}$ packet represents a predetermined packet in the sequence of packets in said GOP, and further comprising the steps of:

setting a counter equal u;

receiving, at said receiving station, a current packet in said GOP;

recovering from a corrupted packet if the received packet was retransmitted;

decreasing said counter by 1 if said received packet is new;

transmitting an NAK packet and setting said counter equal to n if said received packet is said $u^{th}$ packet; and receiving, at said receiving station, a next packet.

9. A network including a wireless station for transmitting data over a wireless link, wherein said network prohibits using positive acknowledgement (ACK) packets, comprising:

a receiving station; and a sending station for transmitting a plurality of sequential data packets to said receiving station, wherein each said plurality of sequential data packets form a respective Group-of-Packet (GOP), wherein said receiving station detects whether any of said received data packets in each current GOP are corrupted before receipt of all data packets in said current GOP, wherein said receiving station transmits a negative acknowledgement (NAK) packet to said sending station, before the receipt of all data packets in said current GOP, only if at least one of said data packets in said current GOP is corrupted, where said NAK packet indicates corrupted data packets, wherein said sending station selectively retransmits said data packets based on the indication of the received NAK packet before transmitting the next GOP to said receiving station if a predetermined time is unexpired, and wherein the prohibition of said ACK packets reduces data propagation delays.

10. The network of claim 9, further comprising a wired station coupled to said wireless station, for receiving said data packets therefrom.

11. The network of claim 9, wherein said sending and receiving station each include a buffer, respectively.

12. The network of claim 9, wherein and receiving station analyzes all data packets in the receiving buffer, to determine said corrupted data packets, once every predetermined time period.

13. The network of claim 12, wherein said predetermined time period equals time required to transmit a complete GOP.

14. The network of claim 9, wherein said NAK packet comprises a GOP identifier and a packet sequence number to indicate which data packets in which GOPs contain corrupted data.

15. The network of claim 11, wherein the sending station buffer having a storage capacity of n+(2×tp) packets, where n equals the number of packets in a GOP, and tp equals the propagation delay.

16. The network of claim 11, wherein the receiving station buffer being of a size capable of storing 2×(n−u) packets, where n equals the number of packets in a GOP, and u equals the time to transmit said ACK packet.

* * * * *